(12) United States Patent
Wu et al.

(10) Patent No.: US 8,549,468 B2
(45) Date of Patent: Oct. 1, 2013

(54) METHOD, SYSTEM AND COMPUTER READABLE STORAGE DEVICE FOR GENERATING SOFTWARE TRANSACTION-LEVEL MODELING (TLM) MODEL

(75) Inventors: Meng-Huan Wu, Hsinchu (TW); Ren-Song Tsay, Jhubei (TW)

(73) Assignee: National Tsing Hua University, Hsin Chu (TW)

( * ) Notice: Subject to any disclaimer, the term of this patent is extended or adjusted under 35 U.S.C. 154(b) by 801 days.

(21) Appl. No.: 12/701,810

(22) Filed: Feb. 8, 2010

(65) Prior Publication Data

US 2011/0197174 A1    Aug. 11, 2011

(51) Int. Cl.
*G06F 9/44*    (2006.01)

(52) U.S. Cl.
USPC ........... 717/104; 717/100; 717/101; 717/120; 717/122

(58) Field of Classification Search
USPC .......................... 717/104, 100, 101, 120, 122
See application file for complete search history.

(56) References Cited

U.S. PATENT DOCUMENTS

| | | | | |
|---|---|---|---|---|
| 5,881,288 A * | 3/1999 | Sumi et al. | ...................... | 717/125 |
| 6,751,583 B1 * | 6/2004 | Clarke et al. | ..................... | 703/17 |
| 7,512,732 B1 * | 3/2009 | Goossens | ....................... | 710/315 |
| 7,881,921 B1 * | 2/2011 | Dobbelaere | ...................... | 703/22 |
| 8,165,865 B2 * | 4/2012 | Parker et al. | ..................... | 703/14 |
| 2004/0158822 A1 * | 8/2004 | Sandham et al. | .............. | 717/138 |
| 2004/0221273 A1 * | 11/2004 | Sandham et al. | .............. | 717/134 |
| 2005/0273772 A1 * | 12/2005 | Matsakis et al. | ............... | 717/136 |
| 2006/0037009 A1 * | 2/2006 | Linden | .......................... | 717/145 |
| 2007/0033572 A1 * | 2/2007 | Donovan et al. | ............... | 717/106 |
| 2008/0313282 A1 * | 12/2008 | Warila et al. | ................. | 709/206 |
| 2010/0138808 A1 * | 6/2010 | Kim et al. | ...................... | 717/104 |
| 2010/0251226 A1 * | 9/2010 | Sato et al. | ...................... | 717/146 |
| 2010/0269103 A1 * | 10/2010 | Wu et al. | ....................... | 717/146 |

OTHER PUBLICATIONS

Schnerr et al, "Cycle Accurate Binary Translation for Simulation Acceleration in Rapid Prototyping of SoCs.+", National Taiwan Univ of Science and Technology, 2005.

* cited by examiner

*Primary Examiner* — Idriss N Alrobaye
*Assistant Examiner* — Getente A Yimer
(74) *Attorney, Agent, or Firm* — Muncy, Geissler, Olds & Lowe, PLLC (57) ABSTRACT

The present invention discloses a system for generating a software TLM model, comprising a processing unit; a compiler coupled to the processing unit to generate target binary codes of a target software; a decompiler coupled to the processing unit to decompile the target binary codes into high level codes, for example C or C++ codes, to generate a functional model of the target software, wherein the functional model includes a plurality of basic blocks; an execution time calculating module coupled to the processing unit to calculate overall execution time of the plurality of the basic blocks of the functional model; a sync point identifying module coupled to the processing unit to identify sync points of the software transaction-level modeling model; and a time annotating module coupled to the processing unit to annotate the overall execution time of the basic blocks and the sync points into the functional model to obtain the software transaction-level modeling model.

14 Claims, 11 Drawing Sheets

METHOD, SYSTEM AND COMPUTER READABLE STORAGE DEVICE FOR GENERATING SOFTWARE TRANSACTION-LEVEL MODELING (TLM) MODEL

FIELD OF THE INVENTION

The present invention relates to software transaction-level modeling (TLM) model, and more particularly to a method, a system and a computer readable medium for generating software transaction-level modeling (TLM) model.

BACKGROUND OF THE INVENTION

As the design complexity of SoC grows, hardware/software (HW/SW) co-simulation becomes more and more crucial for early-stage system verification. To simplify the simulation efforts on register transfer level (RTL) designs, the concept of transaction-level modeling (TLM) for hardware was introduced. By adopting higher abstraction modeling, hardware simulation can be greatly accelerated while key operational information is maintained at the same time. Nevertheless, software is an essential system component, and it also requires proper abstraction models to be compatible with hardware TLM models for efficient HW/SW co-simulation. In particular, it is showed that the complexity of embedded software is rising 140 percent per year, which is greater than that of hardware at 56 percent per year. Obviously, abstraction for software is an urgent subject for investigation, and therefore some conventional approaches have developed in recent years.

Transaction-level modeling (TLM) is formally defined as a high-level approach to model digital systems where the communication among modules is separated from the functional units. A conventional approach integrates an ISS and SystemC. To enable the communication between the two different simulators, the conventional approach employed a bus functional model as a bridge. However, the ISS is quite slow (few MIPS only), and the expensive communication cost further downgrades the simulation speed. In general, the performance of ISS-SystemC co-simulation is unsatisfactory. Furthermore, the conventional approach compiles target source codes by the host compiler, such that target instructions are unavailable. It would make HW/SW interaction points unable to be accurately distinguished. Thus, the source-level software model is incapable of supporting HW/SW co-simulation comprehensively. Obviously, the aforementioned conventional approaches cannot meet the need of efficient and accurate timing synchronization in HW/SW co-simulation. Accordingly, there is still a need for a solution to solve the aforementioned problems in HW/SW co-simulation.

SUMMARY OF THE INVENTION

To solve the aforementioned problems of the conventional approaches, the present invention provides a new system, method and computer readable medium for generating a software transaction-level modeling (TLM) model.

In one aspect of the present invention, the present invention discloses a system for generating a software transaction-level modeling (TLM) model, comprising a processing unit; a compiler coupled to the processing unit to generate target binary codes of a target software; a decompiler coupled to the processing unit to decompile the target binary codes into high level codes, for example C or C++ codes, so as to generate a functional model of the target software, wherein the functional model includes a plurality of basic blocks; an execution time calculating module coupled to the processing unit to calculate overall execution time of the plurality of the basic blocks of the functional model; a sync point identifying module coupled to the processing unit to identify sync points of the software transaction-level modeling (TLM) model; and a time annotating module coupled to the processing unit to annotate the overall execution time of the plurality of the basic blocks and the sync points into the functional model, so as to obtain the software transaction-level modeling (TLM) model.

In another aspect of the present invention, the present invention discloses a method for generating a software transaction-level modeling (TLM) model, comprising generating target binary codes of a target software, wherein the target binary codes include a plurality of instructions; decompiling the target binary codes into high level codes, for example C or C++ codes, to generate a functional model of the target software, wherein the functional model includes a plurality of basic blocks; calculating overall execution time of the plurality of the basic blocks of the functional model by a processing unit; annotating the overall execution time into the functional model by the processing unit; and identifying and annotating sync points in front of each of the instructions by the processing unit.

In still another aspect of the present invention, the present invention discloses a computer readable medium containing computer program instructions, which when executed by a computer, cause the computer to perform the following: generating target binary codes of a target software, wherein the target binary codes include a plurality of instructions; decompiling the target binary codes into high level codes, for example C or C++ codes, to generate a functional model of the target software, wherein the functional model includes a plurality of basic blocks; calculating overall execution time of the plurality of the basic blocks of the functional model by a processing unit; annotating the overall execution time into the functional model by the processing unit; and identifying and annotating sync points in front of each of the instructions by the processing unit. One advantage of the present invention is that the present invention can improve the simulation speed in hardware/software (HW/SW) co-simulation while maintaining desirable accuracy.

This and other advantages will become apparent from the following description of preferred embodiments taken together with the accompanying drawings and the appended claims.

BRIEF DESCRIPTION OF THE DRAWINGS

The present invention may be understood by some preferred embodiments and detailed descriptions in the specification and the attached drawings below. The identical reference numbers in the drawings refer to the same components in the present invention. However, it should be appreciated that all the preferred embodiments of the invention are only for illustrating but not for limiting the scope of the Claims and wherein:

DETAILED DESCRIPTION OF THE PREFERRED EMBODIMENT

The invention will now be described with the preferred embodiments and aspects and these descriptions interpret structure and procedures of the invention only for illustrating but not for limiting the Claims of the invention. Therefore, except the preferred embodiments in the specification, the present invention may also be widely used in other embodiments.

In one embodiment of the present invention, the present invention provides a method for generating software transaction-level modeling (TLM) models utilizing multiple abstraction layers. In one embodiment of the present invention, with reference to FIG. 1, in step 101 target binary codes of target software are generated by compilers, for example target cross compilers, firstly. Given target binary codes, the software TLM models can be automatically generated into corresponding SystemC modules. The software TLM models can be easily integrated with the hardware TLM models because the hardware TLM models also utilizes the SystemC module as the simulator. Then, the two different simulations can be integrated smoothly, and the communication cost between the software TLM models and the hardware TLM models is greatly reduced. In one embodiment of the present invention, the hardware TLM model and the software TLM model can utilize the same simulator, for example the aforementioned SystemC modules, to decrease the time needed to integrate the software TLM model and the hardware TLM model. The complete information of the target software is needed to generate the software TLM models in different abstraction layers. The target binary codes are more ideal to be the input than source codes because the binary codes contain the details about both the target instructions and the data layout in the target memory space comparing with source codes, such that the hardware/software (HW/SW) interactions can be identified precisely. Moreover, target binary codes are usually available because the target processors are usually determined at co-simulation phase.

Figure 4:
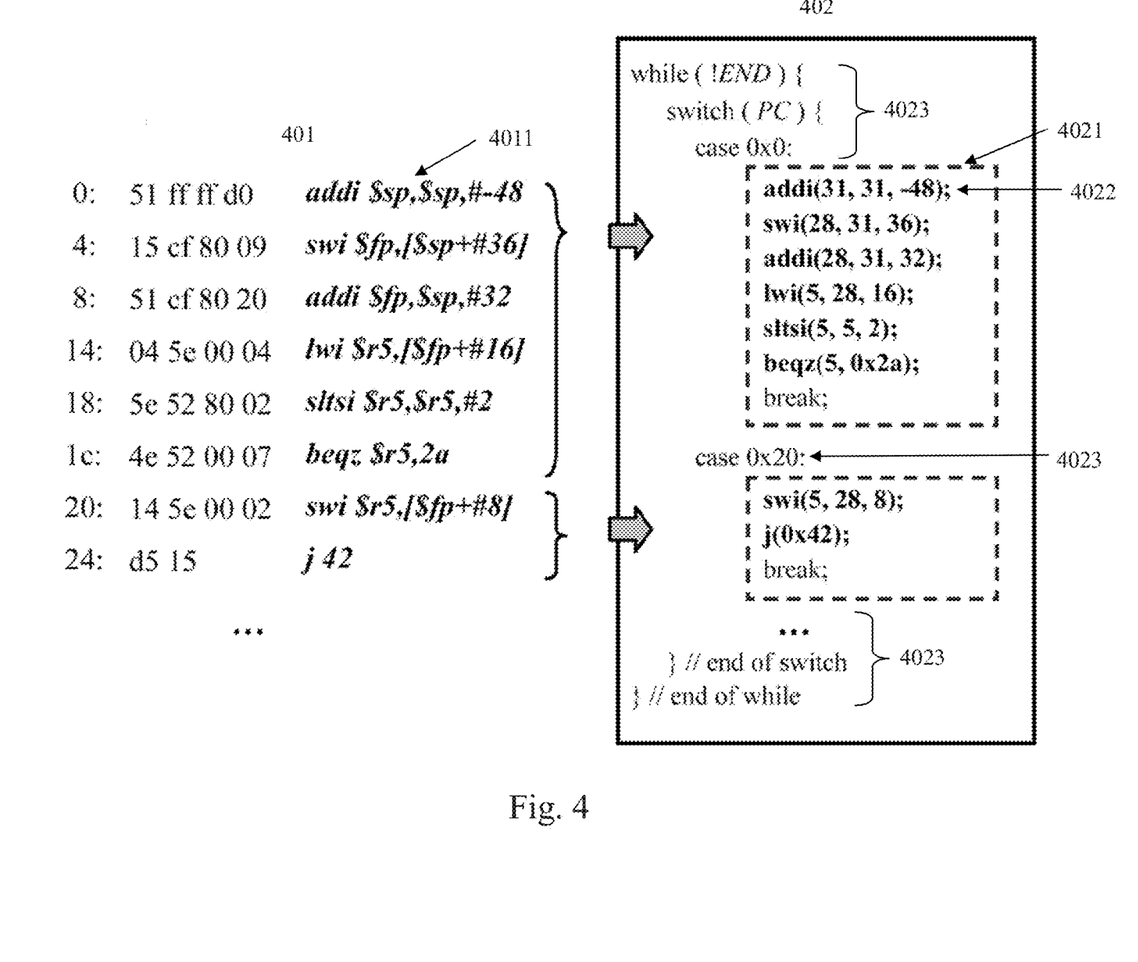
FIG. 4 illustrates a diagram showing the de-compilation for the functional model in accordance with one embodiment of the present invention.

Subsequently, with reference to FIG. 1, in step 102 the target binary codes are decompiled into high level codes, for example C or C++ codes, by a decompiler to generate a functional model of the target software. With reference to FIG. 4, the target binary codes 401 include a plurality of target instructions 4011, and the functional model 402 includes a plurality of basic blocks 4021 composed of a plurality of C functions 4022, and a switch statement 4023. The target instructions include data-access instructions and non-data-access instructions. The data-access instructions include memory access instructions and I/O specific instructions. The memory access instructions include shared variable memory access instructions and local variable memory access instructions. The I/O specific instruction itself belongs to the shared variable access instruction. In the de-compilation stage of the step 102, each target instruction 4011 in the target binary codes 401 is translated into a corresponding C function 4022 in the functional model 402, and each basic block 4021 of the control flow graph (CFG) from the target binary codes 401 is generated in the functional model 402 as for example a switch case. A switch statement 4023 is generated in the functional model 402 to select proper blocks from the multiple basic blocks 4021 to execute based on the value of program counter (PC) during simulation, thereby the generated functional model 402 can execute the correct execution flow. Compared with the traditional ISS which simulates an instruction by performing three steps, i.e. fetching, decoding and executing, the method of the present invention finishes fetching and decoding at the de-compilation stage of step 102. Only executing is required at the later simulation stage, such that the simulation performance of the HW/SW co-simulation utilizing the software TLM model generated by the method of the present invention is greatly improved.

The timed functional model of the target software is needed for accurate timing synchronization. The timing annotation technique is utilized in order to have the timed functional model, such that the timing information can be obtained without considerably downgrading the simulation performance. Regarding to the timing annotation technique, please refer to J. Schnerr, O. Bringmann, and W. Rosenstiel, "Cycle accurate binary translation for simulation acceleration in rapid prototyping of socs," in *DATE* '05, pp. 792-797, 2005, the disclosure of which is incorporated herein by reference in its entirety. Therefore, with reference to FIG. 1, the overall execution time of all basic blocks of the functional model is calculated for example by a processing unit in step 103. In one embodiment, as shown in FIG. 2, the step 103 includes step 1031, step 1032 and step 1033. In the calculation of the overall execution time, the essential execution time of each basic block of the functional model is estimated firstly in step 1031. In one embodiment of the present invention, some dynamic behaviors, for example cache hit/miss and branch prediction, may also influence the execution time. Therefore, as shown in FIG. 2, corresponding correction codes are employed to dynamically adjust the execution time of each basic block in step 1032. Then, as shown in FIG. 2, the adjusted essential execution time of each basic block is summed up by the processing unit during simulation to calculate the overall execution time in step 1033. Then, with reference to FIG. 1, in step 104 the overall execution time is annotated into the functional model by for example the processing unit to obtain the timed functional model of the target software.

Figure 5A:
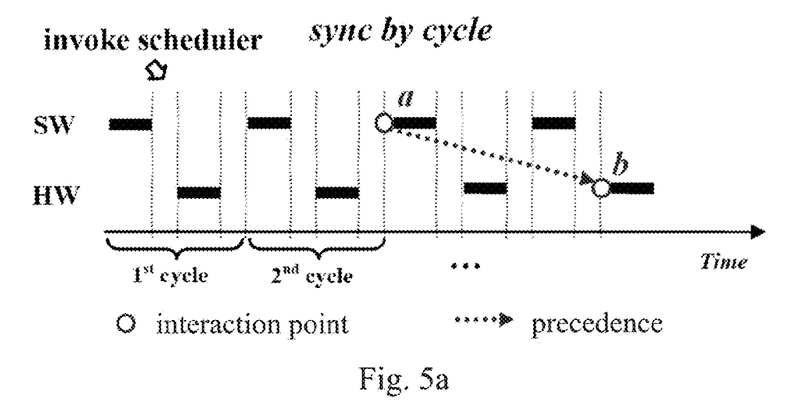
FIG. 5a illustrates a diagram showing timing synchronization by each cycle in accordance with one embodiment of the present invention.
Figure 5B:
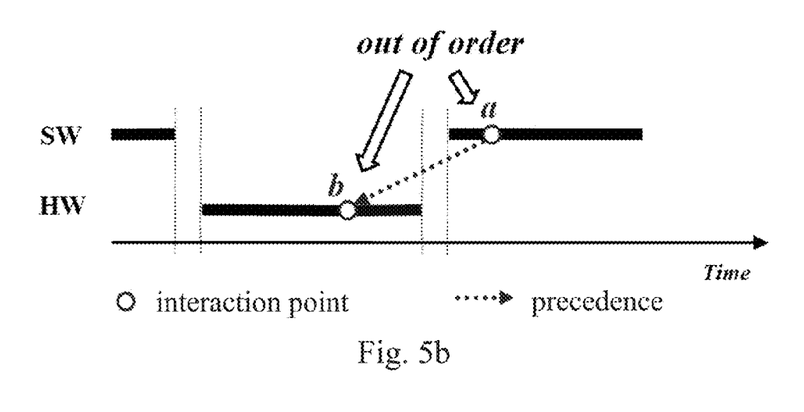
FIG. 5b illustrates a diagram showing an improper granularity of timing synchronization in accordance with one embodiment of the present invention.
Figure 5C:
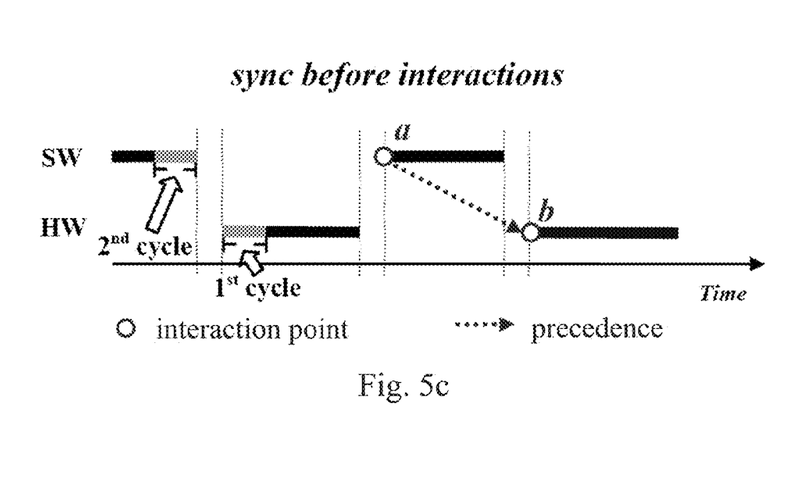
FIG. 5c illustrates a diagram showing timing synchronization before each interaction points in accordance with one embodiment of the present invention.

In HW/SW co-simulation, timing synchronization should be involved between the hardware and software simulations for keeping their concurrency. To handle synchronization, a simulator like SystemC provides a timing synchronization function, i.e. wait function. When this function is called, a scheduler will be invoked to select a proper simulated component to execute. Therefore, the concurrency of simulated components can be cooperatively performed. Ideally, timing synchronization should be performed at each cycle as shown in FIG. 5*a*. In each period of time, the simulations of hardware and software can be executed in order. However, the weighty synchronization overheads would significantly slow down the simulation, such that how to reduce synchronization overheads becomes crucial. Yet, if the granularity of timing synchronization is enlarged improperly, the simulation will be incorrect as illustrated in FIG. 5*b*. Any two different simulated components influence each other through mutual interactions (e.g., interaction a and b in FIGS. 5*a*, 5*b* and 5*c*). It is assumed that the interaction b of the hardware obtains a value produced by the interaction a of the software in FIG. 5*a*. Then, their out-of-order execution in FIG. 5*b* would let b obtain the value not produced by a, which leads to incorrect simulation results. To overcome this issue, the precedence of interactions is defined based on their time ordering. By keeping the precedence, the influence from interactions must be maintained, and the correct simulation results are guaranteed thereby. To achieve the aforementioned, timing synchronization is performed before each interaction point where an interaction may occur, as illustrated in FIG. 5*c*. In such way, part of the simulation between interaction points may be executed out of order. For example, as illustrated by the shaded regions in FIG. 5*c*, the second cycle of the software simulation, supposed to be executed later than the first cycle of the hardware simulation, is actually completed earlier. Nevertheless, since no other operations, except interactions, can directly influence (or be influenced by) other simulated components, the execution order of such operations makes no difference to the results. In conclusion, a transaction can be defined as a sequence of operations, which start from an interaction, including succeeding operations, to the next interaction. Essentially, each transaction can be regarded as an atomic action, and the end of the transaction is a sync point. Because the number of interaction points is considerably smaller than the number of cycles, the synchronization overheads are greatly reduced.

The points where interaction may occur (can be referred to as interaction point) can be different and dependent on the modeling abstraction. More interactions would introduce more synchronization efforts. Therefore, improperly handling timing synchronization either slows down the simulation speed or scarifies the simulation accuracy. The present invention performs timing synchronization only at the time points before HW/SW interactions, such that the accurate simulation result can be achieved efficiently. The time points before hardware/software interactions can be referred to as sync points. Sync points are identified and respectively annotated into the timed functional model of the target software according to each different abstraction layer, for example instruction-level abstraction layer, data-level abstraction layer or shared-variable-level abstraction layer, to determine the time point to perform the synchronization procedure and to generate the software TLM (transaction-level modeling) model.

Figure 6:
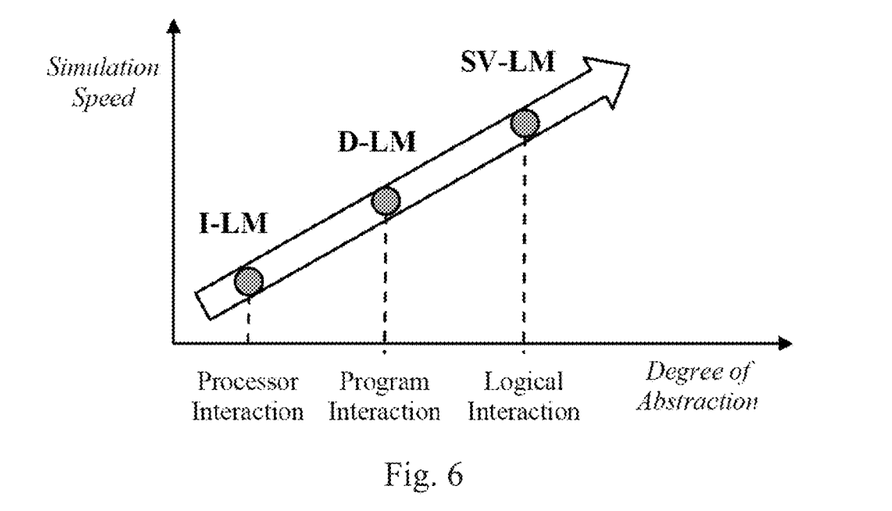
FIG. 6 illustrates a diagram showing the correlation between the degree of abstraction and simulation speed for the three software TLM models in accordance with one embodiment of the present invention.

The software TLM model generated according to the instruction-level abstraction layer is referred to as the instruction-level model (I-LM). The software TLM model generated according to the data-level abstraction layer is referred to as the data-level model (D-LM). The software TLM model generated according to the shared-variable-level abstraction layer is referred to as the shared-variable-level model (SV-LM). At each particular abstraction layer, the execution order of given interactions is ensured by the timing synchronization, such that the accurate simulation can be guaranteed. FIG. 6 shows the correlation between the abstraction degree and simulation speed for the different abstraction layers. As the degree of abstraction rises, some irrelevant interactions are filtered out, such that the number of interaction points decreases. With less synchronization overheads, a higher abstraction layer offers better simulation performance. Most importantly, it disregards detailed interactions and mulls over only those interactions of concerns to this layer. Therefore, if a proper software TLM model is chosen, both the desired accuracy and simulation performance of co-simulation can be accomplished.

Figure 1:
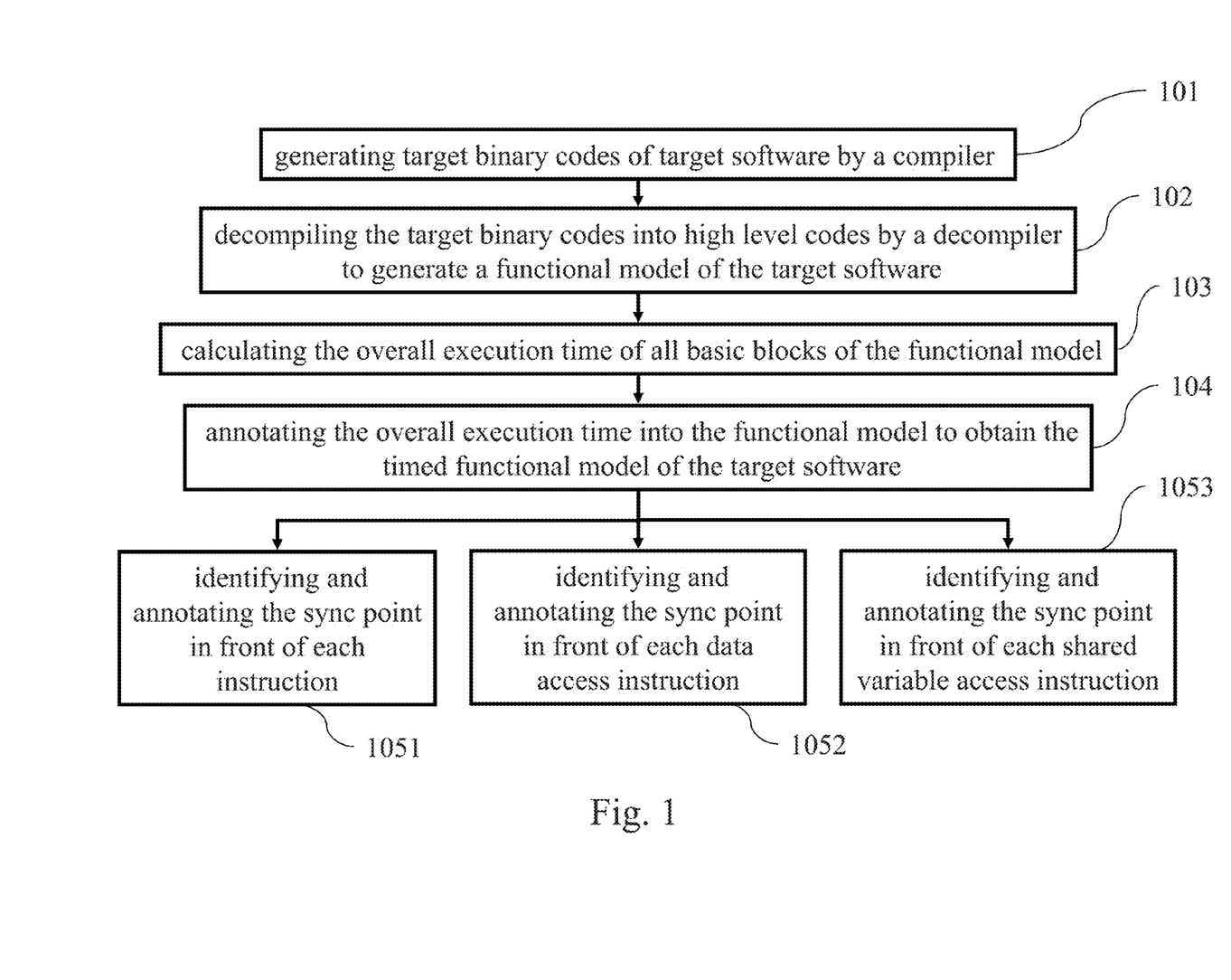
FIG. 1 illustrates a flow diagram of the method for generating a software TLM model in accordance with one embodiment of the present invention.
Figure 2:
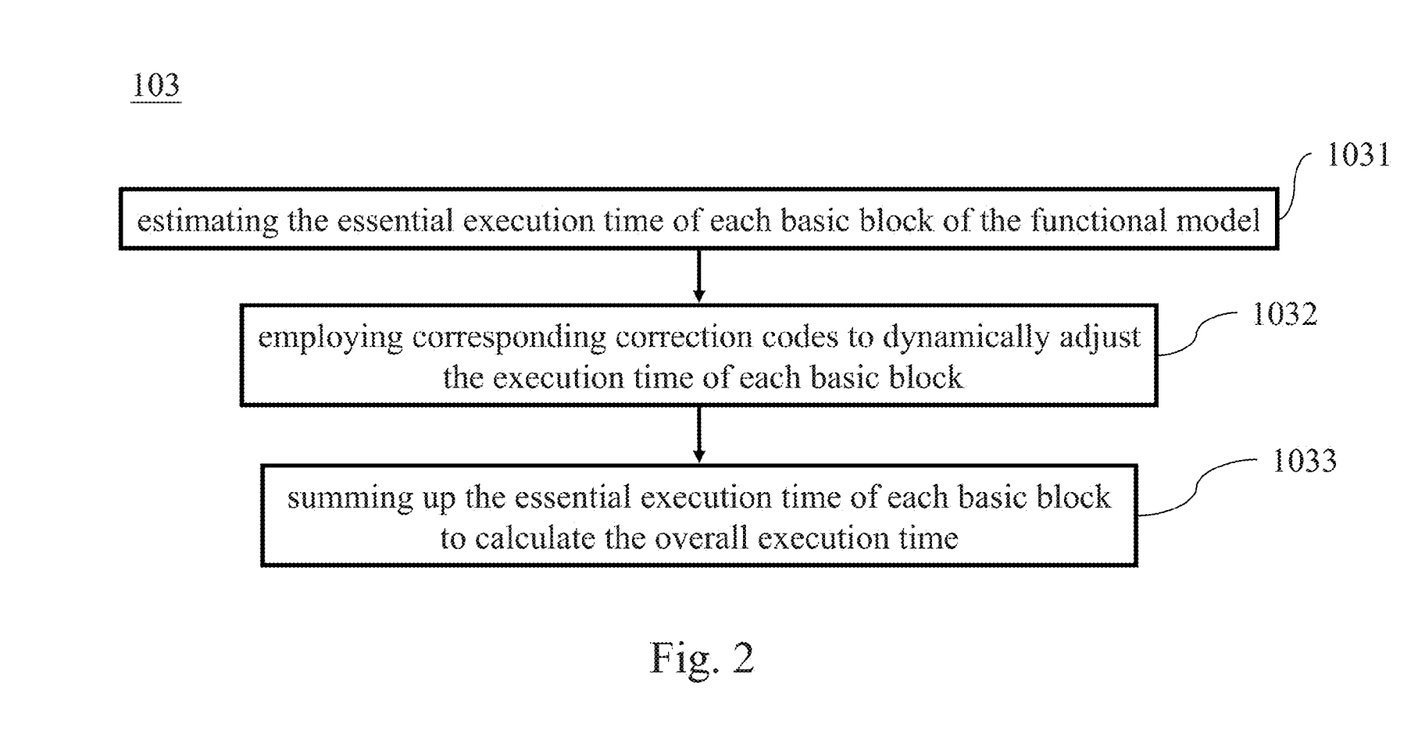
FIG. 2 illustrates a flow diagram of the method for generating a software TLM model in accordance with one embodiment of the present invention.

In one embodiment of the present invention, with reference to FIG. 1, according to an instruction-level abstraction layer, the sync point is identified and annotated in front of each instruction by for example the processing unit in step 1051. Since a processor interacts with other components via memory access, hardware I/O or interrupts, which may occur at any instruction, each instruction should be considered an interaction point. Considering a software component executed on a processor, interactions of a processor are introduced by memory accesses, hardware I/O accesses and interrupts. Memory accesses and hardware I/O accesses are the two ways for a processor to trigger an interaction. Typically, a memory access is via a memory load/store instruction. On the other hand, hardware I/O access has two common mechanisms, i.e. memory-mapped I/O (MMIO) and port-mapped I/O (PMIO). For MMIO, hardware I/O accesses are also activated through memory load/store instructions to particular addresses, which are actually mapped onto hardware registers, whereas for PMIO, they are activated through I/O specified instructions instead.

Correspondingly, hardware components issue interrupts to interact with a processor. Since interrupts may occur at any processor instruction, to capture interrupts in correct order, timing synchronization has to be performed at each instruction.

Figure 7A:
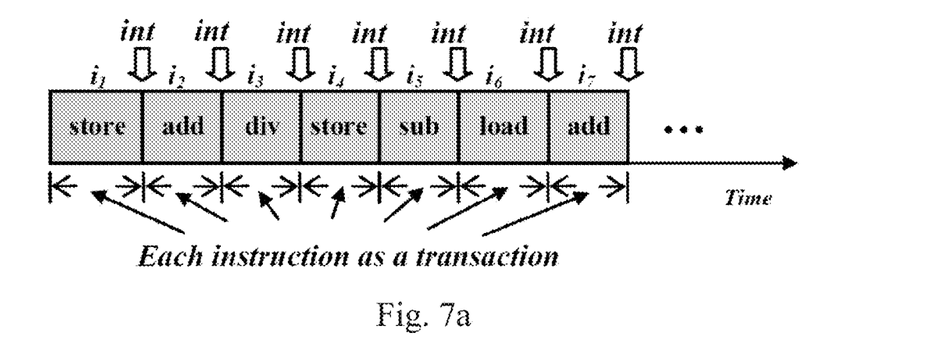
FIG. 7a illustrates a diagram showing the relation between transactions and interrupts in I-LM in accordance with one embodiment of the present invention.

Therefore, for the instruction-level abstraction layer or the instruction-level model, each instruction is an interaction point and is also treated as a transaction, as illustrated in FIG. 7*a*. It should be noted that the shaded instructions in FIG. 7*a* are interaction points. Therefore, the sync point is annotated in front of every instruction. Accordingly, it is named instruction-level model (I-LM). Such fine-grained model intends to handle interrupts precisely, but the excessive synchronization effort would dominate the simulation performance. To accelerate the simulation, the interactions need to be considered in a higher abstraction layer.

In another embodiment of the present invention, with reference to FIG. 1, according to a data-level abstraction layer, the sync point is identified and annotated in front of each data access instruction, for example each memory access instruction and each I/O specific instruction by for example the processing unit, in step 1052. A processor's execution result can be influenced by other components only via data input/output. In other words, a program's interactions go through data accesses, such that each data access instruction is an interaction point. For the data-level abstraction layer or the data-level model, data accesses issued by either memory load/store instructions or I/O specific instructions are considered interaction points. Interrupts from hardware are not treated as interactions points here since they do not change the program results immediately. Indeed, they may influence program execution, but their influence is implicitly through the data accesses issued by the interrupt service routine (ISR) or the other program they trigger. Therefore, as long as the order of data accesses is guaranteed, the program execution results must be correct. Accordingly, a data-level model (D-LM), in which timing synchronization is performed before each data access, is defined.

Figure 7B:
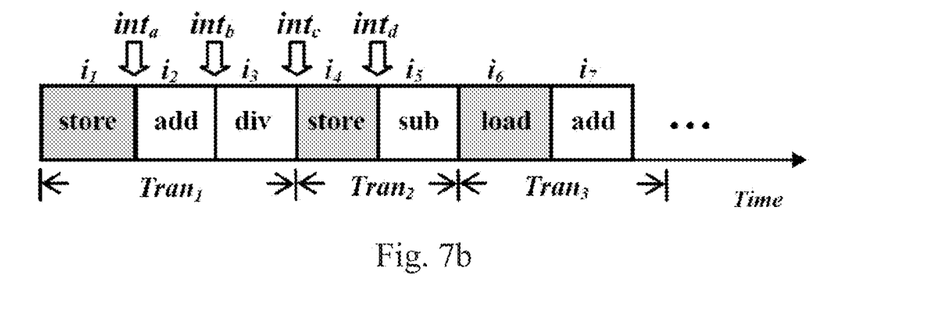
FIG. 7b illustrates a diagram showing the relation between transactions and interrupts in D-LM in accordance with one embodiment of the present invention.

To illustrate the effectiveness of the data-level model, FIG. 7b illustrates an example of various interrupt timings to the program execution results. It should be noted that the shaded instructions in FIG. 7b are interaction points. When a processor receives an interrupt, it will suspend the current program and invoke the corresponding ISR. The ISR can only influence (or be influenced by) the suspended program through its data access. Since the instructions within a transaction (such as $i_2$ (add) and $i_3$ (div)) access registers only, invocation of an ISR cannot affect their results. Consequently, when an interrupt that arrives at time point $int_a$ or $int_b$ is deferred to the end of $Tran_1$ (i.e., $int_o$), the execution result of the transaction remains the same. Meanwhile, the ISR will not be affected by instruction $i_2$ and $i_3$ as well, such that the deferred handling does not affect the result of the ISR either. On the contrary, when an interrupt is handled in a different transaction, it may introduce erroneous simulation results. For instance, if both instruction $i_4$ (store) and the ISR of a particular interrupt access a same data address, then handling the interrupt at time point $int_c$ or $int_d$ would lead to different results. Accordingly, the handling of interrupts must be synchronized before data accesses. In summary, D-LM has a higher abstraction layer on HW/SW interactions than I-LM. Since D-LM requires less synchronization efforts, it allows better simulation performance. Most importantly, D-LM can perform the same simulation results (including the interrupt effect) as ILM does. Hence, it is a preferable model.

Figure 3:
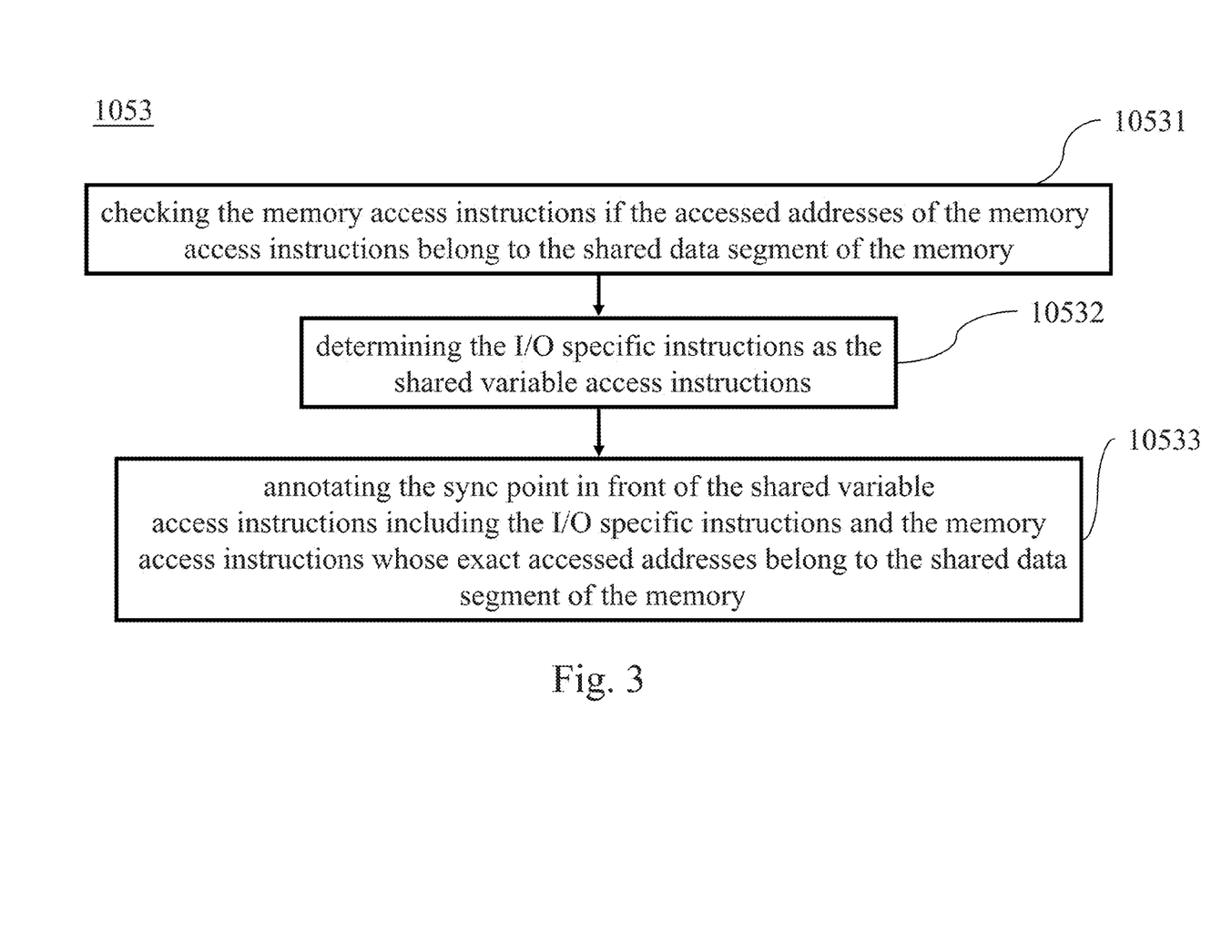
FIG. 3 illustrates a flow diagram of the method for generating a software TLM model in accordance with one embodiment of the present invention.

In still another embodiment of the present invention, with reference to FIG. 1, according to a shared-variable-level abstraction layer, the sync point is identified and annotated in front of each shared variable access instruction, for example the I/O specific instructions and the shared variable memory access instructions, i.e. the memory access instruction whose accessed addresses belong to the shared data segment of the memory, by for example the processing unit in step 1053. As shown in FIG. 3, step 1053 includes step 10531, step 10532 and step 10533. In step 10531, the memory access instructions are checked if the accessed addresses of the memory access instructions belong to the shared data segment of the memory to determine the shared variable access instruction. If the accessed address of a specific memory access instruction belongs to the shared data segment of the memory, the specific memory access instruction will be determined to be the shared variable access instruction. Furthermore, in step 10532, the I/O specific instructions are also determined as the shared variable access instructions. Then, in step 10533, the sync point is annotated in front of the shared variable access instructions including the I/O specific instructions and the memory access instructions whose exact accessed addresses belong to the shared data segment of the memory. The data of a program can be classified into shared variables and local variables.

Figure 7C:
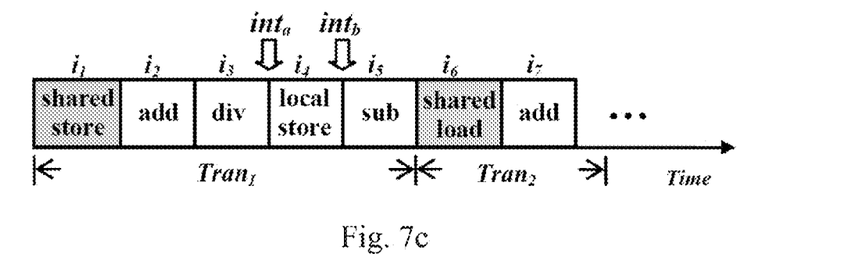
FIG. 7c illustrates a diagram showing the relation between transactions and interrupts in SV-LM in accordance with one embodiment of the present invention.

Logically, the value changes of local variables of a program do not affect the behaviors of others since programs interact with each other only through shared variables, such that only data accesses to shared variables should be taken as interaction points. Hence, focusing on shared variables, a shared-variable-level model (SV-LM), in which timing is synchronized before each shared variable access, is defined. An example is shown in FIG. 7c, where $Tran_1$ and $Tran_2$ are separated by the shared access instruction $i_6$. It should be noted that the shaded instructions in FIG. 7c are interaction points. If data-level model (DLM) is applied, Tran1 will be further divided into two transactions by the local access instruction $i_4$. Now with shared-variable-level model (SV-LM), since $i_4$ accesses a local variable, whether an interrupt arrives before $i_4$ ($int_a$) or after $i_4$ ($int_b$) would make no difference to the program execution results. Comparing with D-LM, SV-LM is even more efficient while it ensures the accuracy of logical interactions. However, this further abstraction of interactions ignores the local variable accesses. Although these accesses are logically irrelevant to others, they still share the same data bus with the shared variable accesses physically. Once the bus contention happens, the latency of the shared variable access can be affected by a local variable access. Consequently, SV-LM is proper to those situations which employ an ideal memory model without contention.

The shared variables can be further classified into two types: software/software (SW/SW) shared variables and hardware/software (HW/SW) shared variables. For SW/SW shared variables, programs share data with each other via memory. The SW/SW shared variable access is issued by a memory access instruction. However, memory access instructions typically adopt the indirect address mode (i.e. memory address indicated by a register instead of an immediate). Consequently, the exact accessed address cannot be known until the instruction is ready for execution, such that step 10531 can be utilized to identify the SW/SW shared variable access instructions. For HW/SW shared variables, the shared variables between hardware and software are located in either memory or hardware registers. For those in memory, the space they store is usually pre-defined, i.e. is the shared data segment of the memory. Similarly, step 10531 can be utilized to identify the HW/SW shared variable access instructions which store shared variables in the memory. On the other hand, when the shared variables are located in hardware registers, hardware I/O specified instructions used for PMIO (port-mapped I/O) can be searched from the instructions in the functional models and are determined as the shared variable access instruction as described in step 10532. As for MMIO (memory-mapped I/O), normal memory access instructions are used, such that step 10531 can be utilized again. Therefore, steps 10531 and 10532 can be utilized to correctly identify the SW/SW shared variable access instructions and HW/SW shared variable access instructions and therefore the sync points can also be identified.

Figure 8:
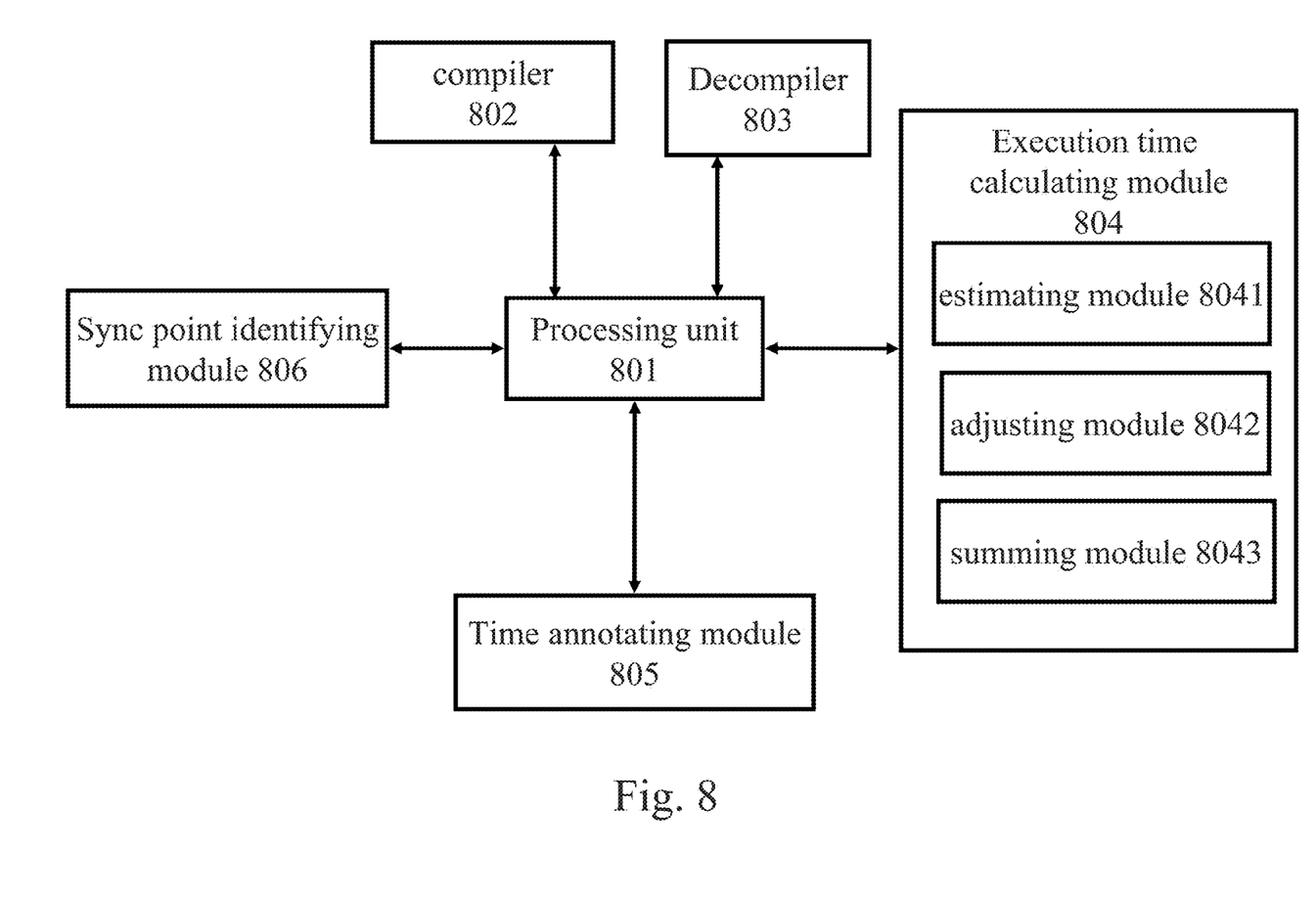
FIG. 8 illustrates a block diagram of the system for generating a software TLM model in accordance with another embodiment of the present invention.

In another embodiment of the present invention, the present invention provides a system for generating software transaction-level modeling (TLM) models. With reference to FIG. 8, the system for generating software transaction-level modeling (TLM) models includes processing unit 801, compiler 802, decompiler 803, execution time calculating module 804, time annotating module 805 and sync point identifying module 806. The compiler 802, the decompiler 803, the execution time calculating module 804, the time annotating module 805 and the sync point identifying module 806 are respectively coupled to the processing unit 801. The execution time calculating module 804 includes estimating module 8041, adjusting module 8042 and summing module 8043. The estimating module 8041, the adjusting module 8042 and the summing module 8043 are respectively coupled to the processing unit 801. The compiler 802 is utilized to generate target binary codes of a target software, and the compiler 802 may be a cross compiler. The decompiler 803 is utilized to decompile the target binary codes into high level codes, for example C or C++ codes, so as to generate a functional model of the target software. As shown in FIG. 4, the functional model 402 includes a plurality of basic blocks 4021. The execution time calculating module 804 is utilized to calculate the overall execution time of all basic blocks of the functional model. The sync point identifying module 806 is utilized to identify the sync points of the software TLM model. The time annotating module 805 is utilized to annotate the overall execution time of all basic blocks and the sync point into the functional model, so as to obtain the software TLM model. Furthermore, the estimating module 8041 is utilized to estimate the essential execution time of each basic block of the functional model. The adjusting module 8042 is utilized to employ correction codes to dynamically adjust the essential execution time of each basic block. The summing module 8043 is utilized to sum up the essential execution time of each basic block to obtain the overall execution time.

Experimental Results

To evaluate the software TLM model generated by the method of the present invention, two experiments are performed. The first experiment demonstrates the simulation speed of the software TLM models generated by the method of the present invention. The second experiment tests a real case of HW/SW co-simulation. The setup of both experiments is as follows: the testing machine is equipped with Intel Xeon 3.4 GHz quad-core and 2 GB ram. The target processor adopts Andes instruction-set architecture. The generated models are simulated on the SystemC 2.2.0 kernel.

Performance of Software TLM Model

The first experiment evaluates the simulation speed of the three different software TLM models. A wait function is annotated for the SystemC scheduler to do timing synchronization. Without any synchronization, the ideal speed of the generated software TLM models attains hundreds of MIPS. Table 1 makes a comparison with a typical ISS which is also without synchronization. The speed of the ISS is only about hundreds of KIPS to few MIPS as reported. This is because an ISS has to perform fetching, decoding, and executing for each time of the execution of one instruction while the method of the present invention only performs once of fetching/decoding for a same instruction no matter how many times it is executed. Since there are a lot of loops within common programs, the time spent on fetching/decoding is greatly reduced in the model generated by the method of the present invention. Therefore, the present invention can outperform the ISS by two to three orders of magnitude in simulation speed.

TABLE 1

The ideal speed comparison with ISS

| The software TLM model of the present invention | ISS |
|---|---|
| 136~248 MIPS | 200 + KIPS~4 + MIPS |

Figure 9:
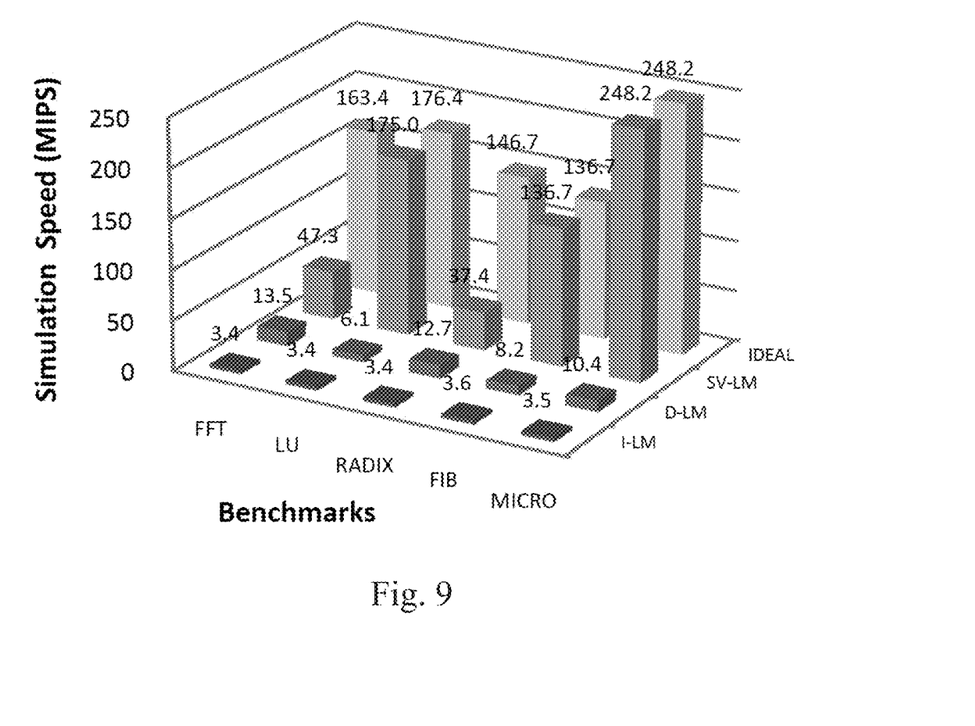
FIG. 9 illustrates a diagram showing simulation speeds in different software abstraction models in accordance with one embodiment of the present invention.

The simulation speeds of the software TLM model generated by the present invention in different abstraction layers are shown in FIG. 9. Here they are tested by five different benchmarks. FFT, LU, and RADIX are parallel programs from SPLASH-2 benchmarks while Micro-benchmark and Fibonacci are sequential programs. The simulation performance of instruction-level model dominated by the synchronization overheads is consistently at around 3 MIPS despite different benchmarks. As for data-level model, synchronization is just required at data accesses, such that it can accelerate up to 6~13 MIPS. Moreover, since shared-variable-level model only synchronizes at shared variable accesses, the simulation speed is further raised to 37~248 MIPS. Especially, for the sequential benchmarks (without shared-variable access), the simulation speed can be as high as the ideal one.

It is obvious that by decreasing the considered interaction points, higher abstraction would greatly improve the simulation performance.

HW/SW Co-Simulation

Figure 10:
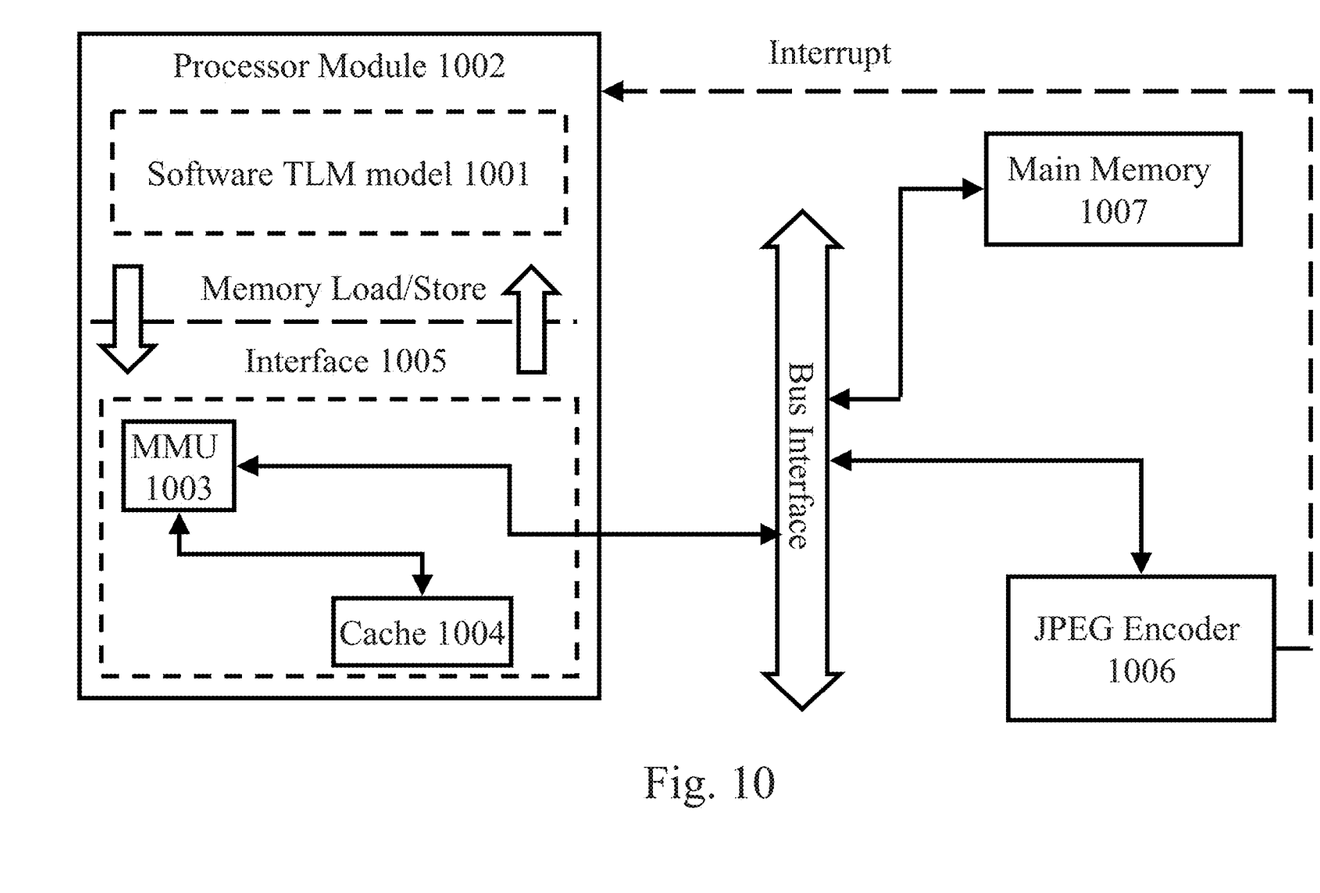
FIG. 10 illustrates a diagram showing the co-simulation of a software TLM model and a hardware JPEG encoder in accordance with one embodiment of the present invention.

In this experiment, a real case is utilized to test HW/SW co-simulation. As shown in FIG. 10, the software TLM model 1001 generated by the method of the present invention, embedded into a processor module 1002 with a MMU (memory management unit) 1003 and a cache 1004, is co-simulated with a hardware JPEG encoder 1006 in the form of the timed TLM model. The MMU 1003 of the processor module 1002 is coupled to the main memory 1007 and the JPEG encoder 1006 through the bus interface. The MMU 1003 is coupled to the cache 1004. The hardware JPEG encoder 1006 may generate interrupts to the processor module 1002. The software TLM model 1001 generated by the method of the present invention may interact with the MMU 1003 and the cache 1004 through the memory load/store interface 1005. The target software, which runs a driver for the JPEG encoder 1006, moves the encoded images from the encoder and then decodes the images. To comprehensively demonstrate the behaviors of the software TLM model generated by the method of the present invention, two common scenarios, i.e. polling and interrupt-driven, for HW/SW interactions are compared. Table 2 shows that in both modes, a software TLM model in a higher abstraction layer has fewer transactions, and the simulation time is shorter.

TABLE 2

Co-simulation result comparison

| | Polling | | Interrupt-driven | |
|---|---|---|---|---|
| Model | Trans. Count | Sim. Time (s) | Trans. Count | Sim. Time (s) |
| I-LM | 14,254,971 | 4.309 | 4,240,657 | 1.352 |
| D-LM | 6,256,378 | 2.089 | 1,965,228 | 0.685 |
| SV-LM | 1,381,914 | 0.720 | 1,381,765 | 0.584 |

Compared with the interrupt-driven mode, more than three times the amount of instructions is simulated in the polling mode since it has to do busy waiting until the completion of the hardware encoder. Consequently, the polling mode requires more simulation time than the interrupt-driven mode. With the method of the present invention, the software TLM models can be easily integrated into a co-simulation environment.

The present invention provides a method for generating software transaction-level modeling (TLM) models utilizing multiple abstraction layers for efficient HW/SW co-simulation. The performance of HW/SW co-simulation is determined by the software modeling, the hardware modeling and the synchronization between the two. The present invention can contribute to the efficiency of software modeling and synchronization. As the experiments show, the software TLM model generated by the method of the present invention allows high speed simulation. The full support of multiple abstraction layers provides the possibility of better performance by reducing synchronization overheads while maintaining desirable accuracy.

Figure 11:
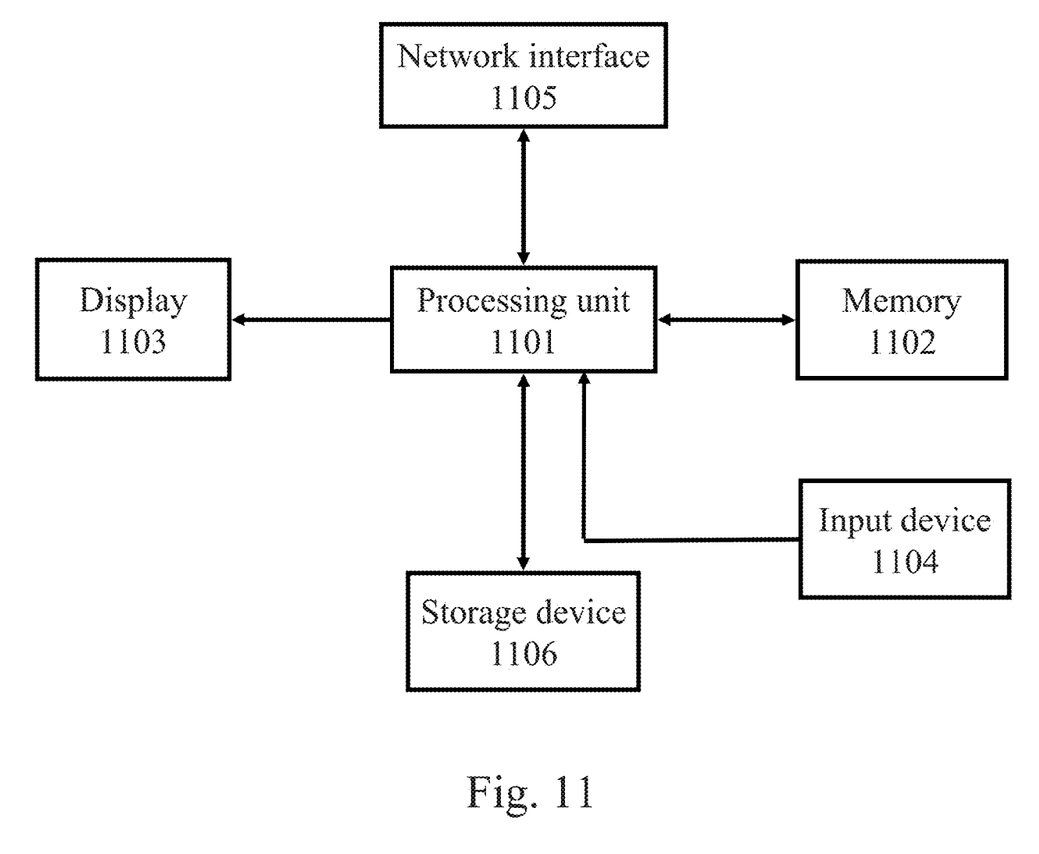
FIG. 11 illustrates a block diagram of an example of a computer cooperating with the method and the system of the present invention in accordance with one embodiment of the present invention.

The aforementioned method and system for generating software transaction-level modeling (TLM) models of the present invention may be performed with the cooperation of a computer described below for illustrating but not for limiting the present invention. As shown in FIG. 11, the computer includes processing unit 1101, memory 1102, display 1103, input device 1104, network interface 1105 and storage device 1106. The memory 1102, the display 1103, the input device 1104, the network interface 1105 and the storage device 1106 are respectively coupled to the processing unit 1101. The input device 1104 includes keyboard, keypad or mouse. The storage device 1106 includes hard disk drive or soft disk drive. The network interface 1105 includes wired network interface or wireless network interface.

The present invention may also be performed in other alternative forms besides the aforementioned embodiments. In an alternative embodiment, the present invention provides a computer readable medium containing computer program instructions, which when executed by a computer, cause the computer to perform any of the aforementioned methods. It should be appreciated that the computer readable medium may be soft disk drive, hard disk drive or any other mediums used to long-termly store computer executable instructions.

The foregoing description is a preferred embodiment of the present invention. It should be appreciated that this embodiment is described for purposes of illustration only, not for limiting, and that numerous alterations and modifications may be practiced by those skilled in the art without departing from the spirit and scope of the invention. It is intended that all such modifications and alterations are included insofar as they come within the scope of the invention as claimed or the equivalents thereof.

What is claimed is:

1. A system for generating a software transaction-level modeling (TLM) model, comprising:
   a processing unit;
   a compiler coupled to said processing unit to generate target binary codes of a target software;
   a decompiler coupled to said processing unit to decompile said target binary codes into high level codes, so as to generate a functional model of said target software, wherein said functional model includes a plurality of basic blocks;
   an execution time calculating module coupled to said processing unit to calculate overall execution time of said plurality of said basic blocks of said functional model;
   a sync point identifying module coupled to said processing unit to identify sync points of said software transaction-level modeling (TLM) model;
   a time annotating module coupled to said processing unit to annotate said overall execution time of said plurality of said basic blocks and said sync points into said functional model, so as to obtain said software transaction-level model (TLM) model;
   wherein said execution time calculating module comprises an estimating module coupled to said processing unit to estimate essential execution time of each of said basic blocks of said functional model; and
   wherein said execution time calculating module further comprises an adjusting module coupled to said processing unit to employ correction codes to dynamically adjust said essential execution time of each of said basic blocks.

2. The system of claim 1, wherein said execution time calculating module further comprises a summing module coupled to said processing unit to sum up said essential execution time of each of said basic blocks to obtain said overall execution time.

3. A method for generating a software transaction-level modeling (TLM) model, comprising:
   generating target binary codes of a target software, wherein said target binary codes include a plurality of instructions;
   decompiling said target binary codes into high level codes to generate a functional model of said target software, wherein said functional model includes a plurality of basic blocks;
   calculating overall execution time of said plurality of said basic blocks of said functional model by a processing unit;
   annotating said overall execution time into said functional model by said processing unit; and
   identifying and annotating sync points in front of each of said instructions by said processing unit;
   wherein the step of calculating overall execution time of said plurality of said basic blocks of said functional model comprises estimating essential execution time of each of said basic blocks of said functional model; and
   wherein the step of calculating overall execution time of said plurality of said basic blocks of said functional model further comprises employing correction codes to dynamically adjust said essential execution time of each of said basic blocks.

4. The method of claim 3, wherein said instructions comprise data access instructions.

5. The method of claim 4, wherein said data access instructions comprise memory access instructions.

6. The method of claim 5, wherein said memory access instructions comprise shared variable memory access instructions.

7. The method of claim 5, wherein the step of identifying and annotating sync points in front of each of said instructions comprises checking said memory access instructions if accessed addresses of said memory access instructions belong to a shared data segment of a memory.

8. The method of claim 6, wherein said data access instructions comprise I/O instructions.

9. The method of claim 3, wherein the step of calculating overall execution time of said plurality of said basic blocks of said functional model further comprises summing up said essential execution time of each of said basic blocks by said processing unit to obtain said overall execution time.

10. A non-transitory computer readable storage device containing computer program instructions, which when executed by a computer, cause said computer to perform the following:
    generating target binary codes of a target software, wherein said target binary codes include a plurality of instructions;
    decompiling said target binary codes into high level codes to generate a functional model of said target software, wherein said functional model includes a plurality of basic blocks;

calculating overall execution time of said plurality of said basic blocks of said functional model by a processing unit;

annotating said overall execution time into said functional model by said processing unit;

identifying and annotating sync points in front of each of said instructions by said processing unit;

wherein the steps of calculating overall execution time of said plurality of said basic block of said functional model comprises estimating essential execution time of each of said basic blocks of said functional model; and wherein the steps of calculating overall execution time of said plurality of said basic balcks of said functional model further comprises employing correction code to dynamically adjust said essential execution time of each of said basic blocks.

11. A non-transitory computer readable storage device of claim 10, wherein said instructions comprise data access instructions.

12. A non-transitory computer readable storage device of claim 11, wherein said data access instructions comprise memory access instructions and wherein the step of identifying and annotating sync points in front of each of said instructions comprises checking said memory access instructions if accessed addresses of said memory access instructions belong to a shared data segment of a memory.

13. A non-transitory computer readable storage device of claim 12, wherein said memory access instructions comprise shared variable memory access instructions and wherein said data access instructions comprise I/O instructions.

14. A non-transitory computer readable storage device of claim 10, wherein the step of calculating overall execution time of said plurality of said basic blocks of said functional model further comprises summing up said essential execution time of each of said basic blocks by said processing unit to obtain said overall execution time.

* * * * *